A. L. LINDROTH.
TEA AND COFFEE STRAINER.
APPLICATION FILED APR. 11, 1908.
956,115.
Patented Apr. 26, 1910.
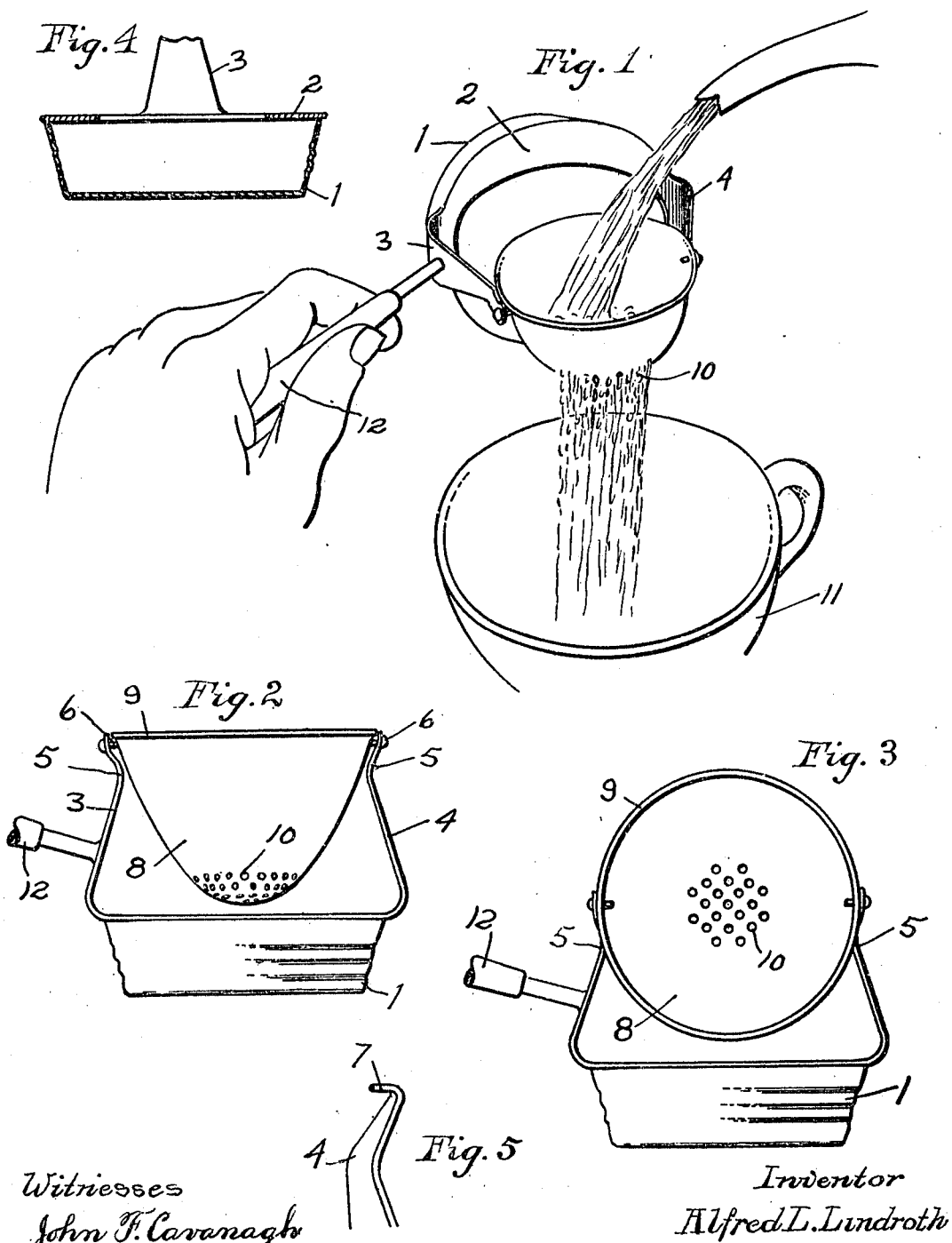
Witnesses
John F. Cavanagh
E. D. Ogden
Inventor
Alfred L. Lindroth
By Howard E. Barlow
Attorney

UNITED STATES PATENT OFFICE.

ALFRED L. LINDROTH, OF RUMFORD, RHODE ISLAND.

TEA AND COFFEE STRAINER.

956,115.  Specification of Letters Patent.  Patented Apr. 26, 1910.

Application filed April 11, 1908.  Serial No. 426,432.

*To all whom it may concern:*

Be it known that I, ALFRED L. LINDROTH, a citizen of the United States, residing at Rumford, in the town of East Providence, in the county of Providence and State of Rhode Island, have invented certain new and useful Improvements in Tea and Coffee Strainers, of which the following is a specification, reference being had therein to the accompanying drawing.

This invention relates to tea or coffee strainers, and has for its object to provide a simple and effective device for receiving and retaining the drip from the strainer after liquid has been poured therethrough. This device is of the class in which the strainer bowl is pivotally held to normally swing above a drip receiving cup-shaped base.

In operating strainers of this character now on the market, the same is usually held in the left hand and the base swung to one side of the bowl, while the tea or coffee is poured from a pot held in the right hand. If the hand is at all shaky and the device is not held steady the bowl, which is loosely mounted on the pivots, will swing or balance back and forth, rendering it somewhat difficult, especially for a nervous person, to direct the stream into said bowl without occasionally hitting the edge, and spattering over the side and soiling the linen. In order to obviate this serious difficulty and render the device much more practical and easier to use, I have provided a positive stop to engage the rolled edge of the bowl when the base has been rotated to the proper angle, either to the right or to the left, so as to steady the bowl and prevent the same from swinging. This stop, in addition to steadying the bowl, serves to indicate to the user the limit or extent to which the base should be tipped or rotated with safety, thus preventing the possibility of pouring the collected drip out over the edge of the receiving base.

A further advantage in the use of this stop is that when dregs or grounds have collected in the bowl, the same may be readily tipped up by rotating the operating handle so that the said deposit may be easily removed therefrom without being obliged to touch the bowl with the hand.

Another feature of my improved construction is that the retaining lips that surround the upper edge of the cup and also the supporting standards are constructed of a single piece of metal, thus obviating the necessity of soldering these standards in position, reducing the expense of construction and rendering the device much neater in appearance.

With these objects in view, the invention consists of certain novel features of construction, as will be more fully described and particularly pointed out in the appended claims.

In the accompanying drawings: Figure 1— is a perspective view illustrating my device in action. Fig. 2— is a side elevation of the device showing the bowl as pivotally held and adapted to normally swing back over the cup-shaped base to catch the drip. Fig. 3— illustrates the bowl as being tipped up at substantially right angles to the base portion, with its edge engaging the inwardly extending portions of the standards which form a positive stop for said bowl. Fig. 4— is a central sectional elevation showing the lip member extending in around the edge of the base portion to form a pocket in which to retain the drippings when the base is turned up at an angle. Fig. 5— is a modification illustrating the outer end of one of the standards showing said end as being bent or turned inward to form a pivot integral therewith on which the bowl may swing.

Referring to the drawings, at 1 is the base portion which may be made of any desired material, but is preferably struck up out of sheet metal into the form of a shallow cup. Around the top edge of this cup is fixed a lip portion 2 which is formed to extend inward toward the center of the same leaving an aperture at its center portion through which the drops from the bowl may fall into the cup. This lip is for the purpose of forming a pocket to prevent the liquid, which has dripped from the bowl of the strainer, from running out, when said base has been carried to one side of the bowl and tipped up at an angle. This lip portion is preferably struck up out of sheet stock and has formed integral with it the two standards 3 and 4 which are subsequently bent up into the shape and position best illustrated in Fig. 2. These standards are bent inward as at 5—5 near their upper ends to form a stop and then bent slightly outward to clear the edge of the bowl and receive the inwardly projecting pivots 6—6. These pivots may be made separate and inserted and soldered into corresponding eyes in the upper ends of these standards, or the upper ends of said standards may be drawn down to a small diameter into the form illustrated at 7 in Fig. 5, whereby the same may be turned inward to form the pivots on which the bowl may swing.

The bowl 8 may be made in any desired shape, but I preferably form the same parabolic in contour and circular in cross section at its upper edge 9, said upper edge being rolled or turned over to stiffen the same and also form a rim adapted to engage the set-in portions 5—5 of the side arms. The lower portion of this bowl is provided with a plurality of small holes 10 to serve as a strainer through which the liquid may pass and to prevent any dregs or grounds which may be contained therein from passing through into the cup, 11, see Fig. 1.

A practical feature of my improved construction is that the handle 12 is set at a slight upwardly projecting angle from the base, and is fixed to one of the standards near its lower or strongest portion, thus rendering the same strong and rigid.

As will be seen from the drawings, the device is provided with a broad base so as to prevent the same from being easily tipped over, the handle being fixed to the lower portion thereof instead of at the top, also lessens the liability of accident. The feature of forming the lip member and the standards in one piece and bending the same up into the desired form lessens the expense of manufacture, does away with the operation of soldering and renders the same stronger, more durable, and neater in appearance. The essential feature of my invention, however, is the forming of the stop to steady the bowl while in operation and regulate the distance, amount or angle that the base may be safely tipped or rotated about the bowl without the liability of the liquid contained in the base running out and soiling the linen. It is also found advantageous in practice to be able to shake out or remove the dregs from the bowl by means of tipping the same by the handle, which would be absolutely impossible with a bowl that swings free and is not provided with a stop.

My improved device is simple and inexpensive in construction, handsome and attractive in appearance and practical and efficient in its operation.

Having thus described my invention, what I claim as new and desire to secure by Letters Patent, is:

1. In a device of the character described, a cup forming a drip receiving base, a retaining flange around said cup, upwardly extending standards on said cup, a strainer bowl pivotally supported in said standards, and means for limiting the extent to which said base may be rotated about the bowl in either direction.

2. In a device of the character described, a cup forming a drip receiving base, a retaining flange around said cup, upwardly extending standards on said cup, a strainer bowl pivotally supported in said standards, and means in said standards whereby the same may engage said bowl to limit the extent to which said base may be rotated about the bowl.

3. A device of the character described comprising a drip cup forming a base, a lip member or flange around the edge of said cup, a pair of standards integral with and extending upwardly from said lip member, a bowl containing a plurality of small holes to serve as a strainer, said bowl being pivotally supported in said standards, and means for limiting the extent to which said bowl shall tip relative to said base.

4. In a device of the character described, a cup forming a drip receiving base, a retaining flange around said cup, upwardly extending standards on said cup, a strainer bowl pivotally supported in said standards, said standards being bent inward near their upper ends to engage the rim of said bowl and limit the extent to which said base may be rotated about the bowl in either direction.

5. A device of the character described comprising a drip cup forming a base, a lip member or flange around the edge of said cup, a pair of standards integral with and extending upwardly from said lip member, a bowl containing a plurality of small holes to serve as a strainer, said bowl being pivotally supported in said standards, said standards being bent inward near their upper ends to engage the rim of said bowl and limit the extent to which said base may be rotated about the bowl in either direction.

6. A device of the character described comprising a drip cup forming a base, a lip member or flange around the edge of said cup, a pair of standards extending upwardly from said lip member, a bowl containing a plurality of small holes to serve as a strainer, each of said standards being made small and turned inward to form pivots on which said bowl may swing, said standards being bent near their upper ends to engage the rim of said bowl and limit the extent to which the base may be rotated about the bowl in either direction.

7. A combined tea or coffee strainer and drip cup consisting of a drip cup the top or open mouth of which is smaller than the body of the cup, upwardly-extending arms on the drip cup, a handle secured at right angles to one of the arms, a hemispherical strainer pivotally secured to the arms over the drip cup, and means for preventing the strainer from oscillating when in use.

In testimony whereof I affix my signature in presence of two witnesses.

ALFRED L. LINDROTH.

Witnesses:
    HOWARD E. BARLOW,
    E. I. OGDEN.